US012712615B2

(12) United States Patent
Kim et al.

(10) Patent No.: US 12,712,615 B2
(45) Date of Patent: Aug. 18, 2026

(54) APPARATUS AND METHOD FOR CONFIGURING PCC/SCC PRIORITIZATION BASED ON EXTREMELY SPARSE CHANNEL INFORMATION IN WIRELESS COMMUNICATION SYSTEM

(71) Applicant: ELECTRONICS AND TELECOMMUNICATIONS RESEARCH INSTITUTE, Daejeon (KR)

(72) Inventors: Jun Sik Kim, Daejeon (KR); Woong Hee Lee, Daejeon (KR); Minhoe Kim, Daejeon (KR); Taewon Song, Daejeon (KR); Jung Im Kim, Daejeon (KR); Soon Gi Park, Daejeon (KR); Sung Cheol Chang, Daejeon (KR); Sun Mi Jun, Daejeon (KR); Yong Seouk Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 323 days.

(21) Appl. No.: 18/511,154

(22) Filed: Nov. 16, 2023

(65) Prior Publication Data

US 2024/0171245 A1 May 23, 2024

(30) Foreign Application Priority Data

Nov. 17, 2022 (KR) ........................ 10-2022-0154892
Apr. 26, 2023 (KR) ........................ 10-2023-0054638

(51) Int. Cl.
*H04L 27/26* (2006.01)
*H04B 7/06* (2006.01)
(Continued)

(52) U.S. Cl.
CPC ......... *H04B 7/0626* (2013.01); *H04L 5/0051* (2013.01); *H04W 72/21* (2023.01)

(58) Field of Classification Search
CPC .... G06N 3/084; H04B 7/0626; H04L 5/0051; H04W 72/21
See application file for complete search history.

(56) References Cited

U.S. PATENT DOCUMENTS 8,599,819 B2 * 12/2013 Kim ...................... H04L 5/0048 370/344
10,275,707 B2 * 4/2019 Ray .......................... G06N 3/09
(Continued)

FOREIGN PATENT DOCUMENTS

CA 2880721 A1 * 2/2014 ......... H04L 27/2639
EP 3817312 A1 * 5/2021 ........... H04B 17/391
(Continued)

*Primary Examiner* — Phuc H Tran
(74) *Attorney, Agent, or Firm* — Rabin & Berdo, P.C.

(57) ABSTRACT

Disclosed is a wireless communication system, specifically, an apparatus and method for configuring a primary cell carrier/secondary cell carrier (PCC/SCC) prioritization only based on extremely partial channel state information in a wireless communication system. Specifically, a method of operating a user equipment (UE) in a wireless communication system includes: transmitting a sounding reference signal (SRS) or channel state information (CSI) to a base station; receiving a signal from the base station on the basis of the SRS or the CSI; and estimating a number of multi-paths using a neural network for the received signal, wherein the estimating of the number of multi-paths includes: reshaping the received signal; extracting a singular value of the reshaped signal; and estimating the number of multi-paths based on the extracted singular value.

18 Claims, 8 Drawing Sheets

(51) Int. Cl.
*H04L 5/00* (2006.01)
*H04W 72/21* (2023.01)

(56) References Cited

U.S. PATENT DOCUMENTS

| | | | | |
|---|---|---|---|---|
| 11,079,495 | B2 * | 8/2021 | Kim | G06N 3/0455 |
| 11,785,421 | B2 * | 10/2023 | Yerramalli | H04L 25/022 455/456.3 |
| 2008/0219369 | A1 * | 9/2008 | Wu | H04L 1/0002 375/260 |
| 2013/0148523 | A1 | 6/2013 | Kim et al. | |
| 2016/0227541 | A1 | 8/2016 | Damnjanovic et al. | |
| 2020/0035256 | A1 * | 1/2020 | Choi | G06N 20/10 |
| 2021/0021297 | A1 * | 1/2021 | Smyth | H04L 25/0204 |
| 2021/0321221 | A1 * | 10/2021 | Yerramalli | H04W 4/029 |
| 2022/0150719 | A1 | 5/2022 | Park et al. | |
| 2022/0173940 | A1 * | 6/2022 | Chen | H04L 25/0224 |
| 2023/0353206 | A1 * | 11/2023 | Ionescu | H04B 7/0617 |
| 2023/0412230 | A1 * | 12/2023 | Saber | G06N 20/10 |
| 2025/0008364 | A1 * | 1/2025 | Park | H04B 7/0478 |

FOREIGN PATENT DOCUMENTS

| | | | | |
|---|---|---|---|---|
| WO | WO-2020061952 | A1 * | 4/2020 | H04B 7/0456 |
| WO | 2021162859 | A1 | 8/2021 | |
| WO | 2022153148 | A1 | 7/2022 | |

* cited by examiner

APPARATUS AND METHOD FOR CONFIGURING PCC/SCC PRIORITIZATION BASED ON EXTREMELY SPARSE CHANNEL INFORMATION IN WIRELESS COMMUNICATION SYSTEM

CROSS-REFERENCE TO RELATED APPLICATION

This application claims priority to and the benefit of Korean Patent Application No. 10-2022-0154892, filed on Nov. 17, 2022, and Korean Patent Application No. 10-2023-0054638, filed on Apr. 26, 2023, the disclosure of which are incorporated herein by reference in its entirety.

BACKGROUND

1. Field of the Invention

The disclosure relates to a wireless communication system, and more specifically to an apparatus and method for configuring a primary cell carrier/secondary cell carrier prioritization only based on partial channel state information in a wireless communication system.

2. Discussion of Related Art

Recently, in the field of wireless communication, there has been a demand for a multiple access system that allows a large number of users to communicate at a higher data rate. However, in the terahertz (THz) frequency band, which has extreme fading effects, it is difficult to obtain channel state information (CSI).

In a high-frequency (mmWave/THz) environment, the extremely small delay spread (a high propagation linearity and limited coverage) leads to significant channel coherence, and wide band width, with insignificant frequency selectivity. For this reason, carrier aggregation (CA)-related issues, such as a primary cell carrier/secondary cell carrier (PCC/SCC) configuration or allocation in the frequency axis, have become less important.

However, due to significant Doppler spread, the channel coherence time is very short. For example, when the center frequency changes from 1 GHz to 100 GHz, a person walking at 3 km/h may appear to move at 300 km/h. Such an issue is referred to as channel aging and is pointed out as a serious problem in an environment of frequencies higher than or equal to an mm Wave frequency.

Therefore, in high-frequency environments, such as for an mmWave/THz frequency, because even a small mobility exhibits great time fluctuation characteristics, the CA issue needs to be handled not only on the frequency axis but also on the time axis, and after configuring a PCC/SCC prioritization map for each user equipment (UE) based on the operation cycle based on the mobility level of the network, the base station needs to collect information for implementing CA more effectively.

SUMMARY OF THE INVENTION

The present invention is directed to providing an apparatus and method for configuring a primary cell carrier/secondary cell carrier (PCC/SCC) prioritization only based on extremely partial channel state information in a wireless communication system.

The present invention is also directed to providing an apparatus and method for responding to mobility issues and channel aging in the terahertz (THz) frequency band in a wireless communication system.

The present invention is also directed to providing an apparatus and method for efficiently configuring PCC/SCC in a wireless communication system.

The present invention is also directed to providing an apparatus and method for configuring a PCC/SCC prioritization map for each user equipment (UE) in a wireless communication system.

According to various embodiments of the present disclosure, a method of operating a UE in a wireless communication system may include: transmitting a sounding reference signal (SRS) or channel state information (CSI) to a base station; receiving a signal from the base station on the basis of the SRS or the CSI; and estimating the number of multi-paths using a neural network for the received signal, wherein the estimating of the number of multi-paths includes: re-shaping the received signal; extracting a singular value of the reshaped signal; and estimating the number of multi-paths based on the extracted singular value.

According to various embodiments, a method of operating a base station in a wireless communication system may include: receiving an SRS or CSI from a UE; and transmitting a signal to the UE on the basis of the SRS or the CSI, wherein the transmitted signal is used for the UE to estimate the number of multi-paths, and a quantized signal is received from the UE on the basis of the multi-paths.

According to various embodiments of the present disclosure, a UE in a wireless communication system includes: a transceiver; and a controller operably connected to the transceiver, wherein the controller is configured to: transmit an SRS or CSI to a base station; receive a signal from the base station based on the SRS or the CSI; and estimate the number of multi-paths using a neural network for the received signal, wherein to estimate the number of multi-paths, the controller is configured to: re-shape the received signal; extract a singular value of the reshaped signal; and estimate the number of multi-paths based on the extracted singular value.

According to various embodiments of the present disclosure, a base station in a wireless communication system includes: a transceiver; and a controller operably connected to the transceiver, wherein the controller is configured to: receive an SRS or CSI from a UE; and transmit a signal to the UE on the basis of the SRS or the CSI, wherein the transmitted signal is used for the UE to estimate the number of multi-paths, and a quantized signal is received from the UE on the basis of the multi-paths.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Terms used herein are used for describing particular embodiments and are not intended to limit the scope and spirit of the present invention. It should be understood that the singular forms "a" and "an" also include the plural forms unless the context clearly dictates otherwise. Terms (including technical and scientific terms) used herein have the same meaning as commonly understood by those of ordinary skill in the art to which this invention belongs. It will be further understood that terms, such as those defined in commonly used dictionaries, should be interpreted as having meanings that are identical or similar to their meanings in the context of the relevant art and will not be interpreted in an idealized or overly formal sense unless expressly so defined herein. In some cases, even terms defined in the present disclosure cannot be construed to exclude embodiments of the present disclosure.

In various embodiments of the present disclosure described below, a hardware approach is illustrated by way of example. However, since the various embodiments of the present disclosure include technology using both hardware and software, the various embodiments of the disclosure do not exclude a software-based approach.

In the following description, the present disclosure relates to an apparatus and method for configuring a PCC/SCC prioritization based on extremely sparse channel information in a wireless communication system. Specifically, the present disclosure describes a technology for improving channel state information (CSI) prediction performance by overcoming the fading characteristics of high-frequency channels (mmWave and THz) in a wireless communication system.

In the following description, terms referring to signals, terms referring to channels, terms referring to control information, terms referring to network entities, terms referring to components of a device, and the like are used for illustrative purposes only for the sake of convenience of description. Accordingly, the present disclosure is not limited to the terms described below, and other terms having equivalent technical meanings may be used.

In addition, although the present disclosure describes various embodiments using terms used in some communication standards (e.g., $3^{rd}$ Generation Partnership Project (3GPP)), this is only an example for description. Various embodiments of the present disclosure may be easily modified and applied to other communication systems.

Figure 1:
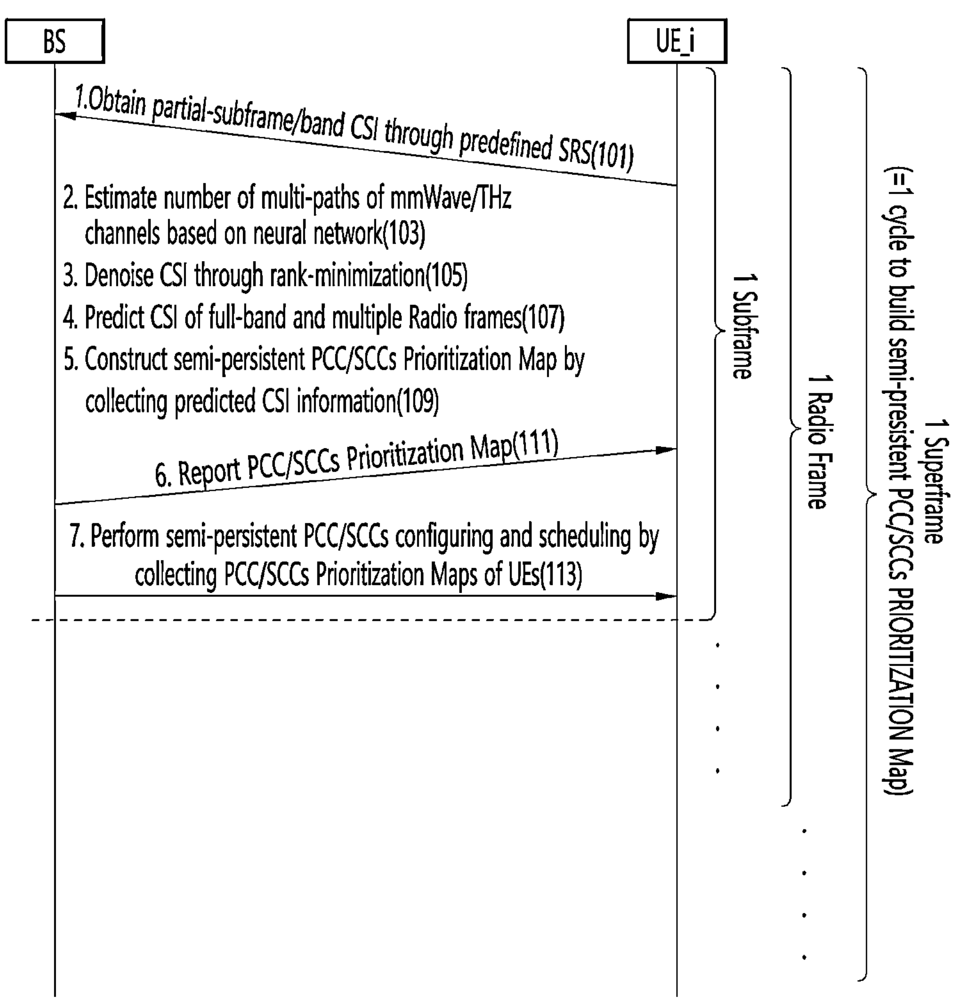
FIG. 1 illustrates a signal flowchart between a base station and a user equipment (UE) according to an embodiment of the present disclosure.

FIG. 1 illustrates a signal flowchart between a base station and a UE, according to an embodiment of the present disclosure.

Referring to FIG. 1, a base station may obtain partial-subframe/band CSI through a predefined sounding reference signal (SRS) (101).

Operation 101 may include a process in which a user equipment (UE) transmits an SRS to a base station, a process in which the base station estimates the channel quality of the UE based on the SRS, and a process in which the UE transmits CSI to the base station. In other words, using CSI and an SRS together, transmission parameters may be adaptively adjusted, and thus overall network performance may be maximized.

The UE may estimate the number of multi-paths of high-frequency channels (e.g., mmWave/THz) based on a neural network (103). Details of operation 103 may be shown in FIG. 2. Through operation 103, the number of multi-paths may be accurately estimated even in a dynamic environment.

The number of multi-paths estimated in operation 103 may be beneficial for processing CSI. The greater the number of multi-paths in a high-frequency channel, the more complex the CSI becomes. In other words, CSI may become complicated due to various factors, such as reflection, refraction, and scattering of multi-paths, so it is important to appropriately estimate the number of multi-paths. For example, when a small number of multi-paths are estimated, communication performance may be lowered due to a lack of CSI, and when an excessively large number of multi-paths are estimated, computational complexity may increase and CSI may become too complex to process.

The UE may remove CSI noise through rank-minimization based on the number of multi-paths (105). According to an embodiment, rank-minimization is based on matrix decomposition techniques. Using the matrix decomposition techniques, a matrix may be approximated by the number of specific rows or columns being reduced in the matrix. According to another embodiment, rank-minimization may include rank alternation. Rank alternation may be used to approximate a low-density matrix. By rank alternation, a matrix may be decomposed into two matrices, a low-rank matrix and a sparse matrix. That is, the low-rank matrix represents the basic structure of the CSI, and the sparse matrix may represent noise or interference of the CSI caused by reflection, diffraction, and scattering of signals. By gradually increasing the rank of the lower-rank matrix, rank alternation may effectively remove noise or interference from the CSI and reconstruct the original signal transmitted by the base station.

The UE may predict all the data through sparse information (107). For operation 107, compressed sensing, geometric series decomposition techniques, and the like may be used. In other words, in operation 107, an operation of predicting missing data that has occurred in operation 105 may be performed. That is, in operation 107, the CSI of full-band and multiple radio frames may be predicted.

Compressed sensing is a technology of reconstructing original data by compressing collected data into a low-dimensional space, and has the benefits of effectively collecting and storing a large amount of data. Compressed sensing is used to predict data that is missing in the CSI prediction process. Compressed sensing may be useful for reconstructing high-dimensional data from data sampled at low dimensions. To this end, a mathematical model that may linearly transform sampled data to reconstruct the original data with a small number of measurements may be generated, and the compressed data may be reconstructed based on the mathematical model.

The geometric series decomposition technique is a technique of decomposing complex data, such as signals or images, into several parts and processing the parts of data. The geometric series decomposition technique may be used to estimate missing data in a real-time CSI prediction algorithm. The geometric series technique may include a sparse representation process, a geometric decomposition process, and a row number fusion process. The sparse representation may be used to transform a data set into a sparse representation using a discrete cosine transform, a wavelet transform, singular value decomposition, and the like to remove redundancy and capture the most important features of the data.

The geometric decomposition may be a process of decomposing the sparse representation into sets of subspaces using a geometric approach. The geometric decomposition may include a task of dividing the dataset into even smaller subspaces based on geometry, such as the curvature, direction or proximity to other points of the dataset. The row number fusion may be a process of re-fusing the subspaces to reconstruct the original dataset. The row number fusion may use a row number model to capture statistical dependencies between subspaces and enable accurate reconstruction and robustness against noise.

Operations 105 and 107 may help improve the accuracy and reliability of CSI, which is important for effective communication in wireless communication systems.

In order to report to the base station, the UE may quantize all the data output in operation 107 according to a predefined quantum level (109). According to an embodiment, the quantum level may be determined according to the congestion level. For example, when there is a large amount of data to report, the UE may use lower quantum levels to increase accuracy. In other words, for a higher congestion level, a lower quantum level may be used to increase the accuracy.

In other words, a semi-persistent PCC/SCC prioritization map may be constructed by collecting CSI predicted through operation 109.

Operation 109 may help effectively compress CSI data and reduce the transmission bandwidth. In other words, a larger amount of CSI data may be transmitted with less bandwidth.

The UE may transmit data quantized in operation 109 to the base station using a physical uplink control channel (PUCCH) (111). In other words, a PCC/SCC prioritization map constructed in operation 109 may be reported.

In operation 113, operations 101 to 111 may be performed again semi-persistently within an appropriate period. According to an embodiment, 1 cycle may be initially set to 1 super-frame, and may be reset depending on the mobility level of the network. In other words, the higher the level of network mobility, that is, the more frequent the occurrences of mobility, the shorter the cycle period may be set. Conversely, the lower the level of mobility, the longer the cycle period may be set to increase resource use efficiency.

Figure 2:
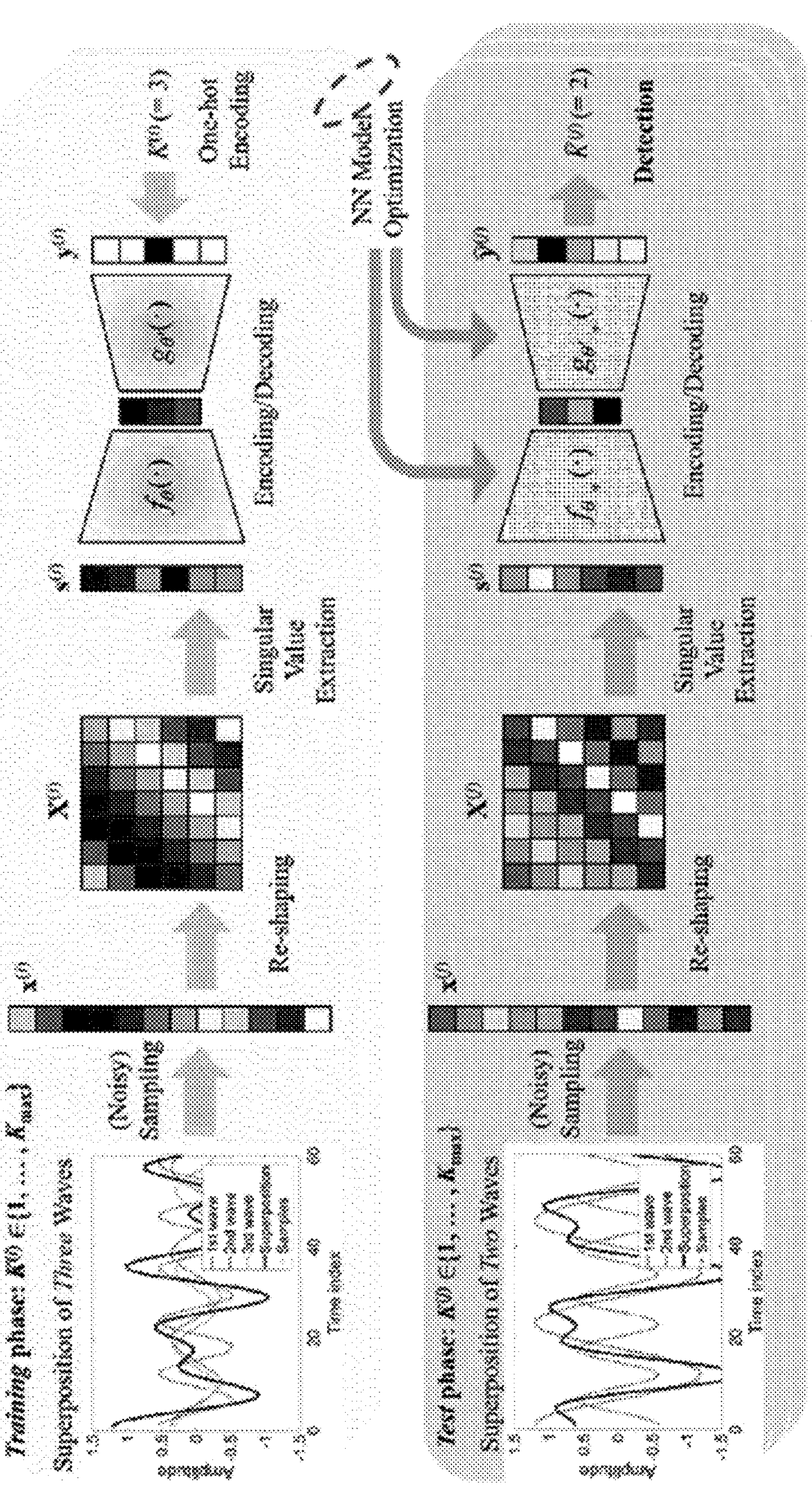
FIG. 2 illustrates an operation for estimating the number of multi-paths of a high-frequency channel according to an embodiment of the present disclosure.

FIG. 2 illustrates an operation for estimating the number of multi-paths of a high-frequency channel according to an embodiment of the present disclosure.

Referring to FIG. 2, variables included in FIG. 2 may be defined as follows.

K: the number of signals.

$\hat{K}$: the estimate of the number of signals.

xk: a k-th sampled signal vector with a length of L.

x: the summation of {x1, . . . , and xK} with noise.

X: an informative matrix generated by x.

s: an informative vector of which elements are descending-ordered singular values (including zeros) of X.

y: a one-hot encoding vector for a corresponding K.

fθ: an encoding function of a neural network gθ': a decoding function of a neural network.

M: the number of training datasets

N: the number of test datasets

Referring to FIG. 2, a mathematical property that the rank value of X becomes equal to K when a received signal x is a noise-free signal and is re-shaped as in X may be used. In other words, in an ideal situation (e.g., a noise-free signal), a vector s generated by gathering singular values of X according to size may be given valid values only for K singular values and zero for the remaining singular values.

Re-shaping may be performed by arranging sampled data diagonally, as shown in FIG. 2.

When the received signal x is not ideal (e.g., noisy), the low-rank property collapses, but valid information still remains in the vector s, and the mapping relationship between the vectors s and y (the one-hot encoding vector for the corresponding K) may be established through a neural network.

To obtain the relationship between the vectors s and y, encoding/decoding may be performed, and encoding/decoding may be obtained through neural network model optimization.

As a result, the rank of y may be determined to be the number of multi-paths.

In other words, when designing a neural network framework, the received signal x is not simply input, but x is re-shaped into X and singular values of X are extracted and then input, which is the main feature of the present disclosure.

Such a configuration may enable light-weighting of a network model, which is a key consideration when applying artificial intelligence technology in mobile communications (e.g., minimizing the number of datasets for training, minimizing the number of network parameters, and the like).

The embodiment of FIG. 2 may be an independent embodiment, and may not only be related to a technique for analyzing channel sparsity in point-to-point communication, but also expanded to a technique for predicting the number of transmitters on a communication network when only line of sight (LoS) communication is assumed.

The algorithm for the embodiment of FIG. 2 is as follows.

| Training phase | |
|---|---|
| 1: | Collect the training dataset, i.e., x(i) and K(i) for all i ∈ {1, . . ., M }. |
| 2: | for i ← 1 to M do |
| 3: | Re-shape x(i) to X(i). |
| 4: | Extract the informative vector s(i) from X(i). |
| 5: | Make the one-hot encoding vector y(i) from K(i). |
| 6: | end for |
| 8: | Optimize the encoding/decoding functions, i.e., {fθ*, gθ' * }, by inputting and outputting {s(1),. . . , s(M)} and { y (1), . . ., y (M)}, respectively. |

Test phase

-continued

| | |
|---|---|
| 1: | Collect the test dataset, i.e., x(j) and K(j) for all j ∈ {1, . . ., N }. |
| 2: | for j ← 1 to N do |
| 3: | Make the input vector s(j) referring step 4 and 5. |
| 4: | Regenerate $\hat{y}$(j) by passing s(j) to the optimized neural network {fθ*, gθ' * }. |
| 5: | Obtain $\hat{K}$(j) as the index of maxima of $\hat{y}$(j). |
| 6: | end for |

That is, FIG. 2 is an algorithm for estimating the number of radio waves, and may be universally used not only in the disclosure but also in other inventions.

In the following description, FIGS. 3 to 7 show experimental data for the embodiment of FIG. 2, and the experimental environment is as follows.

Model: The complex-gain of each radio signal follows a complex Gaussian distribution, and the number K of signals is generated in a uniform distribution within a given range (e.g. [1, 2, 3, 4]).

Problem: Estimating the number of THz signals received

Method: Using an artificial neural network based on FIG. 2

Comparison algorithm:

- Baseline 1: Utilizing the absolute value of the received signal
- Baseline 2: Independently utilizing real/imaginary parts of the received signal
- Baseline 3: Utilizing a fast Fourier transform (FFT) result of the received signal
- Baseline 4: Estimating linear algebraic rank In the following description, FIGS. 3 to 7 may be experimental data for verifying the performance of the proposed techniques according to five scenarios based on the embodiment of FIG. 2.

Figure 3:
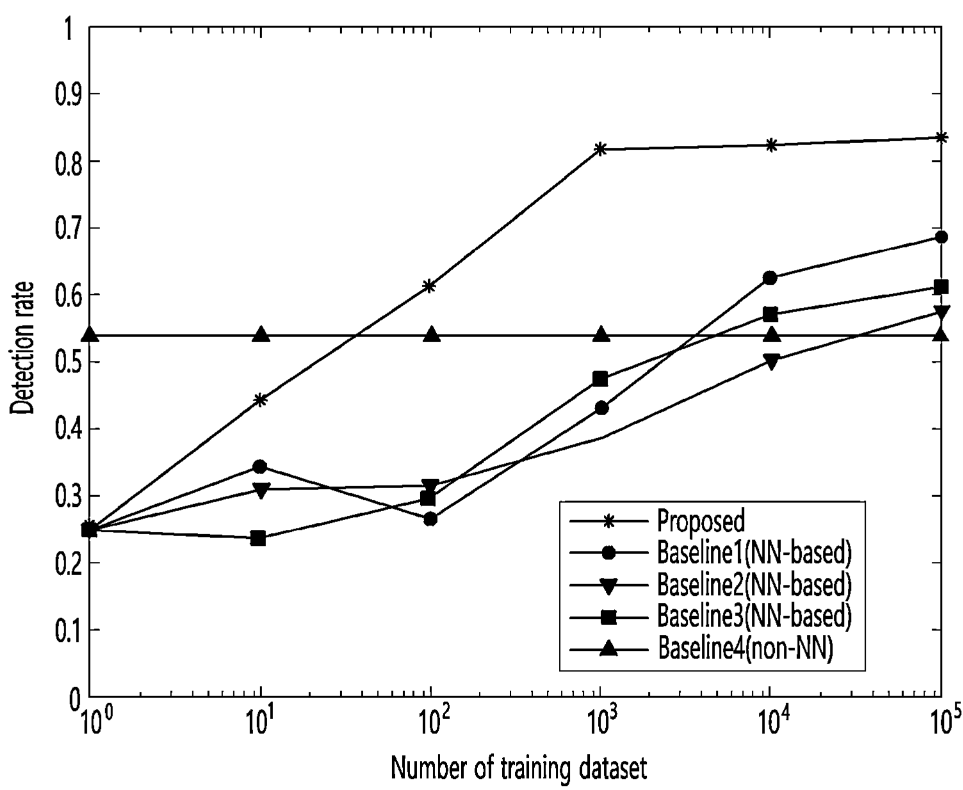
FIG. 3 illustrates first experimental data according to an embodiment of the present disclosure.

FIG. 3 illustrates first experimental data according to an embodiment of the present disclosure.

Referring to FIG. 3, it can be seen that the disclosure shows better performance than the linear algebra-based technique from the moment the number of training datasets reaches 100, and performs better than other artificial intelligence-based techniques on the whole.

The experimental environment of FIG. 3 may be summarized as follows.

# of symbols: 16

Maximum value of K: 4

SNR: 25 dB

Network depth: 2

Neurons per hidden layer: 12

Figure 4:
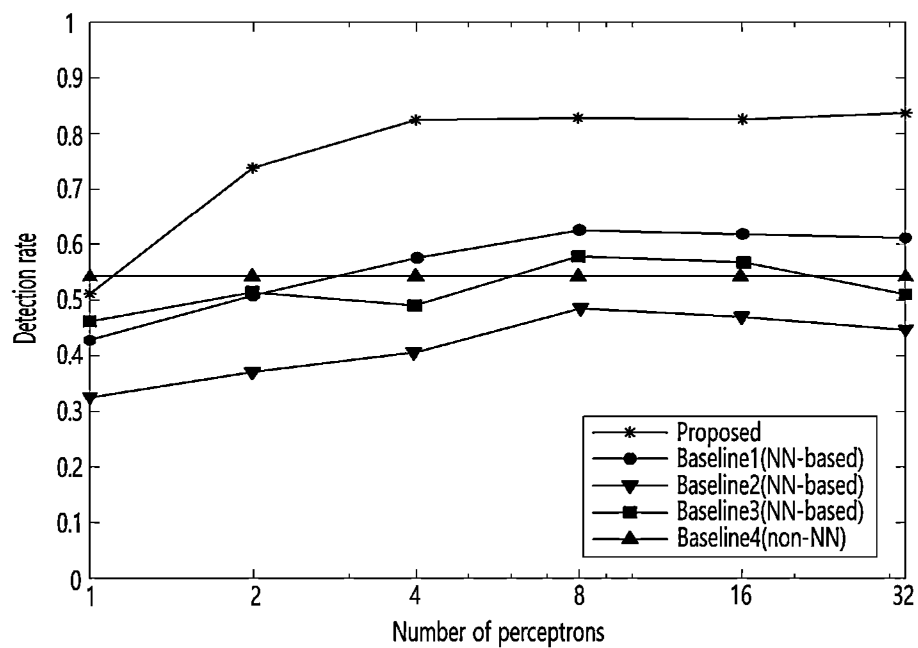
FIG. 4 illustrates second experimental data according to an embodiment of the present disclosure.

FIG. 4 illustrates second experimental data according to an embodiment of the present disclosure.

Referring to FIG. 4, it can be seen that the disclosure shows better performance than the linear algebra-based technique from the moment the number of neurons (perceptrons) per hidden layer reaches 2, and performs better than other artificial intelligence-based techniques on the whole.

The experimental environment of FIG. 4 may be summarized as follows.

# of symbols: 16

Maximum value of K: 4

SNR: 25 dB

Network depth: 2

Number of training datasets: 10000

Figure 5:
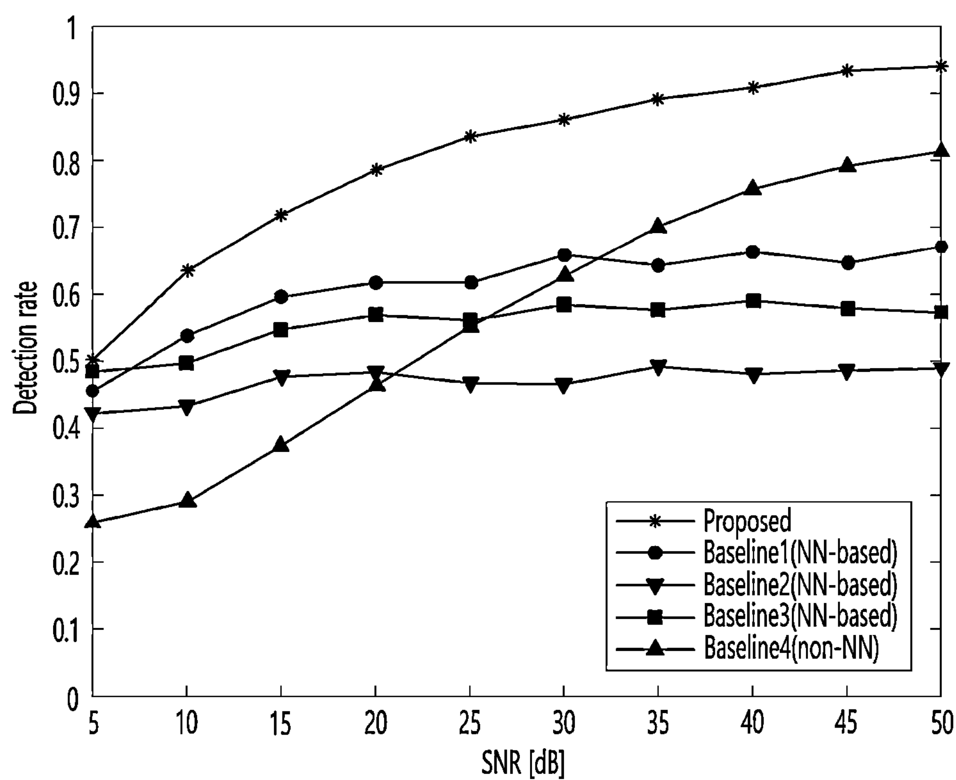
FIG. 5 illustrates third experimental data according to an embodiment of the present disclosure.

FIG. 5 illustrates third experimental data according to an embodiment of the present disclosure.

Referring to FIG. 5, it can be seen that the disclosure shows better performance than other artificial intelligence-based techniques and the linear algebra-based estimation technique.

The experimental environment in FIG. 5 may be summarized as follows.

# of symbols: 16

Maximum value of K: 4

Neurons per hidden layer: 12

Network depth: 2

Number of training datasets: 10000

Figure 6:
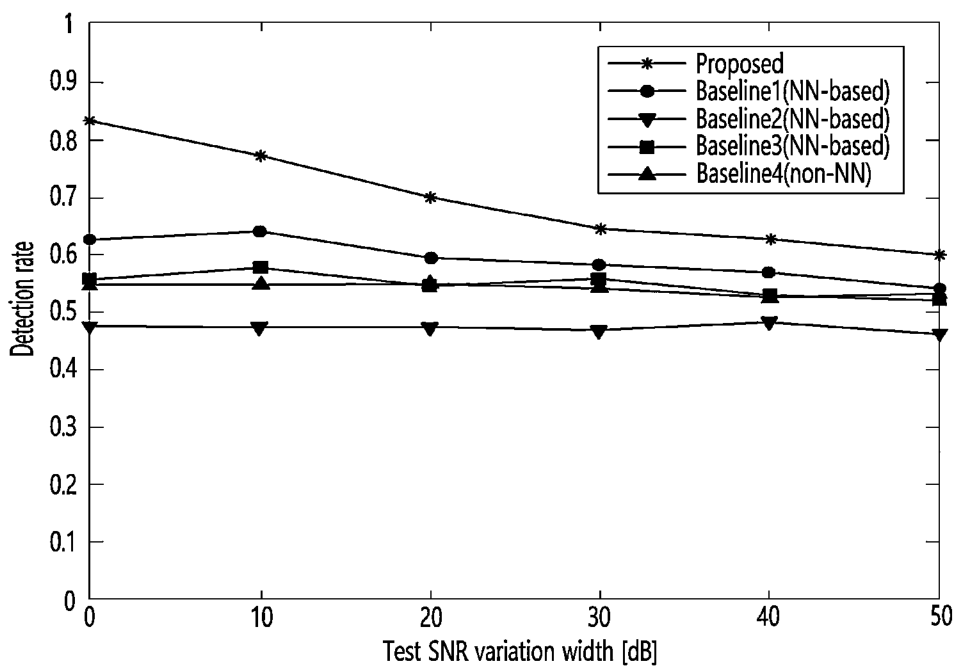
FIG. 6 illustrates fourth experimental data according to an embodiment of the present disclosure.

FIG. 6 illustrates fourth experimental data according to an embodiment of the present disclosure.

Referring to FIG. 6, it can be seen that the disclosure illustrates better performance than other artificial intelligence-based techniques and the linear algebra-based technique on the whole. For example, it can be seen that when the x-axis value is 20 dB, the test signal-to-noise ratio (SNR) is randomly generated in the range of [15 dB, 35 dB] centered on the training SNR of 25 dB.

The experimental environment of FIG. 6 may be summarized as follows.

# of symbols: 16

Maximum value of K: 4

Neurons per hidden layer: 12

Network depth: 2

Number of training datasets: 10000

SNR: 25 dB

Figure 7:
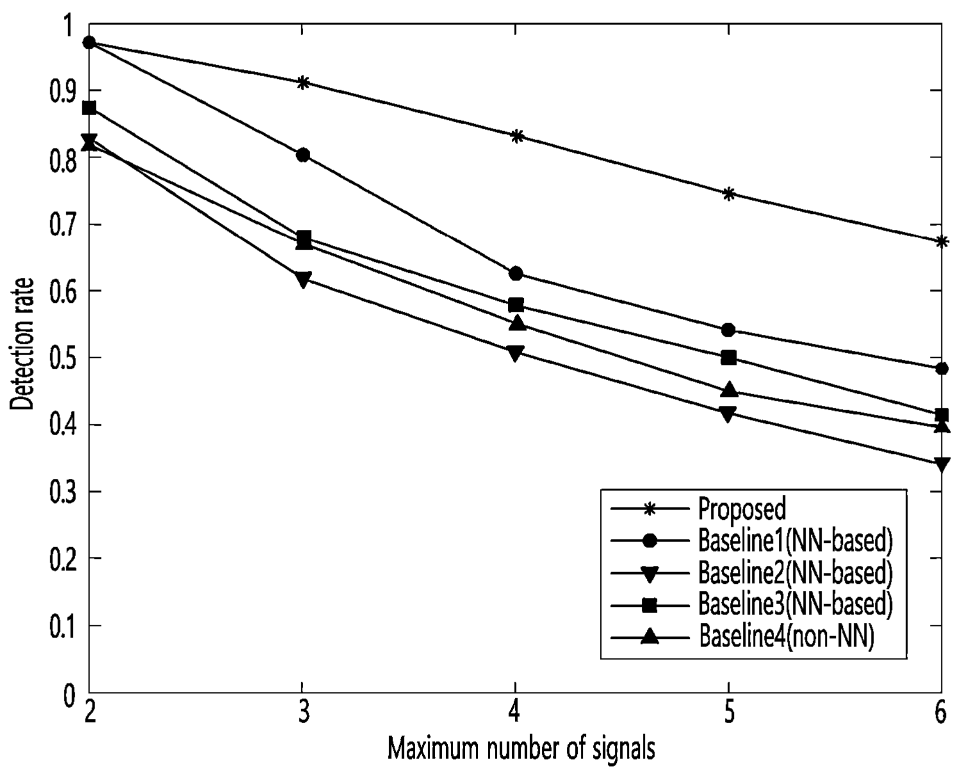
FIG. 7 illustrates fifth experimental data according to an embodiment of the present disclosure.

FIG. 7 illustrates fifth experimental data according to an embodiment of the present disclosure.

Referring to FIG. 7, it can be seen that the disclosure shows better performance than other artificial intelligence-based techniques and the linear algebra-based technique on the whole.

The experimental environment in FIG. 7 may be summarized as follows.

# of symbols: 16

Neurons per hidden layer: 12

Network depth: 2

Number of training datasets: 10000

SNR: 25 dB

As described above, the present disclosure may be implemented to overcome the fading characteristics of the high-frequency channel, thereby improving CSI prediction performance, and also collect a PCC/SCC prioritization map for each UE set by a base station, thereby obtaining a higher level of multi-user diversity gain and improving the transmission rate.

According to various embodiments of the present disclosure, a method of operating a UE in a wireless communication system may include: transmitting an SRS or CSI to a base station; receiving a signal from the base station on the basis of the SRS or the CSI; and estimating the number of multi-paths using a neural network for the received signal, wherein the estimating of the number of multi-paths includes: re-shaping the received signal; extracting a singular value of the reshaped signal; and estimating the number of multi-paths based on the extracted singular value.

According to an embodiment, the estimating of the number of multi-paths based on the extracted singular value may include: encoding and decoding a matrix generated based on the singular value; obtaining an output matrix based on the encoding and decoding; and determining a rank value of the output matrix to be the number of multi-paths.

According to an embodiment, the encoding and decoding of the matrix generated based on the singular value may be performed based on a network model optimization.

According to an embodiment, the method may further include removing noise of the CSI based on the estimated number of multi-paths.

According to an embodiment, the method may further include predicting all data based on the CSI from which the noise has been removed.

According to an embodiment, the method may further include quantizing all the data based on quantum levels According to an embodiment, the quantum level may be determined according to a congestion level.

According to an embodiment, the method may further include transmitting the quantized data to the base station using a PUCCH.

According to an embodiment, the method may further include determining a cycle of an operation performed by the UE based on a mobility level of a network.

According to various embodiments, a method of operating a base station in a wireless communication system may include: receiving an SRS or CSI from a UE; and transmitting a signal to the UE on the basis of the SRS or the CSI, wherein the transmitted signal is used for the UE to estimate the number of multi-paths, and a quantized signal is received from the UE on the basis of the multi-paths.

According to various embodiments of the present disclosure, a UE in a wireless communication system includes: a transceiver; and a controller operably connected to the transceiver, wherein the controller is configured to: transmit an SRS or CSI to a base station; receive a signal from the base station based on the SRS or the CSI; and estimate the number of multi-paths using a neural network for the received signal, wherein to estimate the number of multi-paths, the controller is configured to: re-shape the received signal; extract a singular value of the reshaped signal; and estimate the number of multi-paths based on the extracted singular value.

According to an embodiment, to estimate the number of multi-paths based on the extracted singular value, the controller may be configured to: perform encoding and decoding on a matrix generated based on the singular value; obtain an output matrix based on the encoding and decoding; and determine a rank value of the output matrix to be the number of multi-paths.

According to an embodiment, to perform the encoding and decoding on the matrix generated based on the singular value, the controller may operate based on a network model optimization.

According to an embodiment, the controller may remove noise of the CSI based on the estimated number of multi-paths.

According to an embodiment, the controller may predict all data based on the CSI from which the noise has been removed.

According to an embodiment, all the data may be quantized based on quantum levels.

According to an embodiment, the quantum level may be determined according to a congestion level.

According to an embodiment, the controller may transmit the quantized data to the base station using a PUCCH.

According to an embodiment, the controller may determine a cycle of an operation performed by the UE based on a mobility level of a network.

According to various embodiments of the present disclosure, a base station in a wireless communication system includes: a transceiver; and a controller operably connected to the transceiver, wherein the controller is configured to: receive an SRS or CSI from a UE; and transmit a signal to the UE on the basis of the SRS or the CSI, wherein the transmitted signal is used for the UE to estimate the number of multi-paths, and a quantized signal is received from the UE on the basis of the multi-paths.

Figure 8:
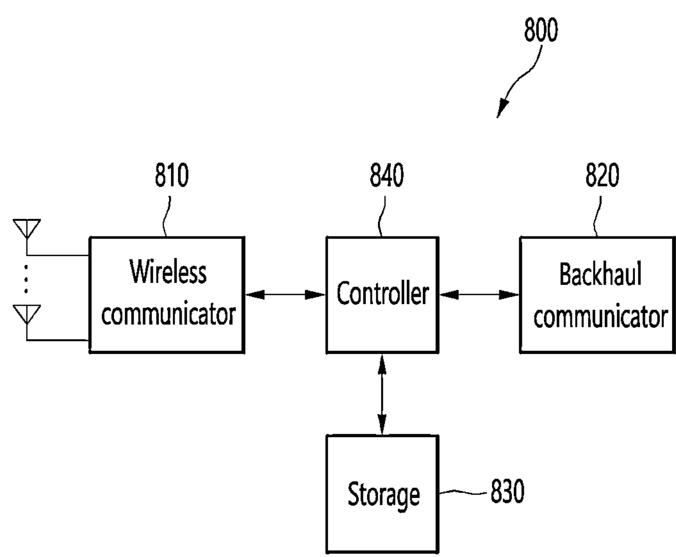
FIG. 8 illustrates a block diagram of a base station in a wireless communication system according to various embodiments of the present disclosure.

FIG. 8 illustrates a block diagram of a base station in a wireless communication system according to various embodiments of the present disclosure. Components illustrated in FIG. 8 may be understood as components of a base station 800. The term "unit" or "device" used in the following description may refer to a unit of processing one or more functions or operations, and may be implemented as hardware or software or a combination of hardware and software.

Referring to FIG. 8, the base station may include a wireless communicator 810, a backhaul communicator 820, a storage 830, and a controller 840.

The wireless communicator 810 may transmit and receive wireless signals through a wireless channel. For example, the wireless communicator 810 may perform a transformation function between a baseband signal and a bit sequence according to the physical layer specifications of the system. Additionally, when transmitting data, the wireless communicator 810 may generate complex symbols by encoding and modulating a transmission bit sequence. When receiving data, the wireless communicator 810 may reconstruct the received bit sequence by demodulating and decoding the baseband signal.

The wireless communicator 810 may up-convert the baseband signal into a radio frequency (RF) band signal and transmit the up-converted baseband signal through an antenna, and down-convert an RF band signal received through the antenna into a baseband signal. To this end, the wireless communicator 810 may include a transmission filter, a reception filter, an amplifier, a mixer, an oscillator, a digital-to-analog convertor (DAC), an analog-to-digital convertor (ADC), and the like.

The wireless communicator 810 may include a plurality of transmission and reception paths, and the wireless communicator 810 may include at least one antenna array including a plurality of antenna elements.

In terms of hardware, the wireless communicator 810 may include a digital unit and an analog unit, and the analog unit may include a number of sub-units according to operating power, operating frequency, and the like. The digital unit may be implemented with at least one processor (e.g., a digital signal processor (DSP)).

The wireless communicator 810 may transmit and receive wireless signals as described above. Accordingly, all or part of the wireless communicator 810 may be referred to as a "transmitter," a "receiver," or a "transceiver." Additionally, in the following description, transmission and reception performed through a wireless channel may include processing as described above being performed by the wireless communicator 810.

The backhaul communicator 820 may provide an interface for communicating with other nodes in the network.

That is, the backhaul communicator 820 may convert a bit sequence transmitted from the base station to other nodes, such as other access nodes, other base stations, upper nodes, core networks, and the like into a physical signal, and convert a physical signal received from the other nodes to a bit sequence.

The storage 830 may store data, such as a basic program, an application program, and setting information for operation of the base station. The storage 830 may include a volatile memory, a non-volatile memory, or a combination of volatile and non-volatile memories. Additionally, the storage 830 may provide stored data upon request from the controller 840.

The controller 840 may control overall operations of the base station. For example, the controller 840 may transmit and receive signals through the wireless communicator 810 or the backhaul communicator 820. Additionally, the controller 840 may write or read data to or from the storage 830. Additionally, the controller 840 may perform functions of a protocol stack required by communication standards.

To this end, the controller 840 may include at least one processor.

According to various embodiments of the present disclosure, the controller 840 may control the base station according to FIGS. 1 and 2 to perform operations according to various embodiments described below.

Figure 9:
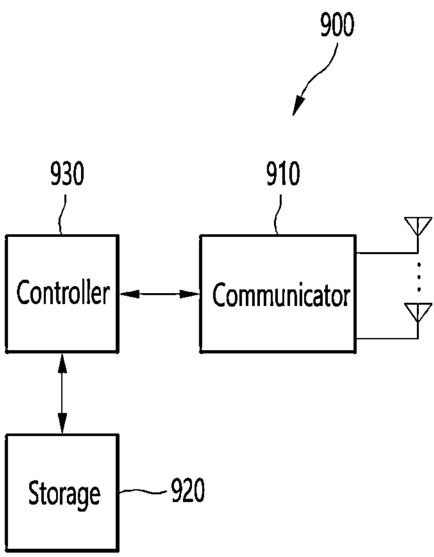
FIG. 9 illustrates a block diagram of a UE in a wireless communication system according to various embodiments of the present disclosure.

FIG. 9 illustrates a block diagram of a UE in a wireless communication system according to various embodiments of the present disclosure. Components illustrated in FIG. 9 may be understood as components of a UE 900. The term "unit" or "device" used in the following description may refer to a unit of processing one or more functions or operations, and may be implemented as hardware or software or a combination of hardware and software.

Referring to FIG. 9, a UE may include a communicator 910, a storage 920, and a controller 930.

The communicator 910 may perform functions for transmitting and receiving signals through a wireless channel. For example, the communicator 910 may perform a transformation function between a baseband signal and a bit sequence according to the physical layer standard of the system. For example, when transmitting data, the communicator 910 may generate complex symbols by encoding and modulating a transmission bit sequence. When receiving data, the communicator 910 may reconstruct the received bit sequence by demodulating and decoding the baseband signal. In addition, the communicator 910 may up-convert the baseband signal into a radio frequency (RF) band signal and transmit the up-converted baseband signal through an antenna, and down-convert an RF band signal received through the antenna into a baseband signal. For example, the communicator 910 may include a transmission filter, a reception filter, an amplifier, a mixer, an oscillator, a DAC, an ADC, and the like.

In addition, the communicator 910 may include a plurality of transmission and reception paths, and the communicator 910 may include at least one antenna array including a plurality of antenna elements. In terms of hardware, the communicator 910 may include a digital unit and an analog unit (a radio frequency integrated circuit (RFIC)). Here, the digital circuit and the analog circuit may be implemented in one package. Additionally, the communicator 910 may include multiple RF chains. Furthermore, the communicator 910 may perform beamforming.

The communicator 910 may transmit and receive wireless signals as described above. Accordingly, all or part of the communicator 910 may be referred to as a "transmitter," a "receiver," or a "transceiver." Additionally, in the following description, transmission and reception performed through a wireless channel may include processing as described above being performed by the communicator 910.

The storage 920 may store data, such as a basic program, an application program, and setting information for operation of the UE. The storage 920 may include a volatile memory, a non-volatile memory, or a combination of volatile and non-volatile memories. Additionally, the storage 920 may provide stored data upon request from the controller 930.

The controller 930 may control overall operations of the UE. For example, the controller 930 may transmit and receive signals through the communicator 910. Additionally, the controller 930 may write or read data to or from the storage 920. The controller 930 may perform functions of a protocol stack required by communication standards. To this end, the controller 930 may include at least one processor or at least one microprocessor, or may be part of a processor. Additionally, part of the communicator 910, and the controller 930 may be referred to as a communication processor (CP).

According to various embodiments of the present disclosure, the controller 930 may control the UE according to FIGS. 1 and 2 to perform operations according to various embodiments.

Methods according to the claims of the present disclosure or the embodiments described in the specification may be implemented in hardware, software, or a combination of hardware and software.

When implemented in software, a computer-readable storage medium for storing one or more programs (software modules) may be provided. One or more programs stored on a computer-readable storage medium are configured for execution by one or more processors in an electronic device. The one or more programs include instructions that cause the electronic device to perform the methods in accordance with the claims of the present disclosure or the embodiments described in the specification.

Such programs (software modules, software) may be stored in a random access memory, a non-volatile memory including a flash memory, a read only memory (ROM), an electrically erasable programmable read only memory (EEPROM), a magnetic disk storage device, a compact disc-ROM (CD-ROM), a digital versatile disc (DVD), or other types of optical storage devices, or a magnetic cassette. Alternatively, the programs may be stored in a memory composed of a combination of some or all thereof. In addition, each configuration memory may be included in plurality.

In addition, the programs may also be stored on attachable storage devices that may be accessed through communication networks, such as the Internet, an intranet, a local area network (LAN), a wide area network (WAN), or a storage area network (SAN), or a communication network composed of a combination of the communication networks. Such a storage device may be connected to a device performing an embodiment of the present disclosure through an external port. In addition, a separate storage device on a communication network may be connected to a device performing an embodiment of the present disclosure.

In the specific embodiments of the present disclosure described above, components included in the disclosure are expressed in a singular or plural form according to the specific embodiments presented. However, the singular or plural expression is appropriately selected for the context presented for convenience of description, and the present disclosure is not limited to the singular or plural component, and a component expressed in a plural form may be composed of a singular component, and a component expressed in singular form may be composed of a plurality of components.

As is apparent from the above, the apparatus and method according to various embodiments of the present disclosure can improve the performance of predicting CSI by overcoming the fading characteristics of high-frequency (mmWave and THz) channels.

In addition, with a PCC/SCC prioritization map configured for each UE, the base station can provide considerable multiuser diversity gain.

The effects of the present disclosure are not limited to the effects described above, and other effects that are not described will be clearly understood by those skilled in the art from the above detailed description.

Meanwhile, although specific embodiments have been described in the detailed description of the present disclosure, various modifications are possible without departing from the scope of the present disclosure. Therefore, the scope of the present disclosure should not be limited to the described embodiments and should be defined by the claims described below as well as equivalents to the claims.

What is claimed is:

1. A method of operating a user equipment (UE) in a wireless communication system, the method comprising:

transmitting a sounding reference signal (SRS) or channel state information (CSI) to a base station;

receiving a signal from the base station on the basis of the SRS or the CSI; and estimating a number of multi-paths using a neural network for the received signal, wherein the estimating of the number of multi-paths includes:

re-shaping the received signal;

extracting a singular value of the reshaped signal;

inputting the extracted singular value into the neural network; and estimating the number of multi-paths based on the extracted singular value.

2. The method of claim 1, wherein the estimating of the number of multi-paths based on the extracted singular value includes:

encoding and decoding a matrix generated based on the singular value;

obtaining an output matrix based on the encoding and decoding; and determining a rank value of the output matrix to be the number of multi-paths.

3. The method of claim 2, wherein the encoding and decoding of the matrix generated based on the singular value is performed based on a network model optimization.

4. The method of claim 1, further comprising removing noise of the CSI based on the estimated number of multi-paths.

5. The method of claim 4, further comprising predicting all data based on the CSI from which the noise has been removed.

6. The method of claim 5, further comprising quantizing all the data based on quantum levels.

7. The method of claim 6, wherein the quantum level is determined according to a congestion level.

8. The method of claim 6, further comprising transmitting the quantized data to the base station using a physical uplink control channel (PUCCH).

9. The method of claim 8, further comprising determining a cycle of an operation performed by the UE based on a mobility level of a network.

10. A user equipment (UE) in a wireless communication system, the UE comprising:

a transceiver; and a controller operably connected to the transceiver, wherein the controller is configured to:

transmit a sounding reference signal (SRS) or channel state information (CSI) to a base station;

receive a signal from the base station based on the SRS or the CSI; and estimate a number of multi-paths using a neural network for the received signal, wherein, to estimate the number of multi-paths, the controller is configured to:

re-shape the received signal;

extract a singular value of the reshaped signal;

input the extracted singular value into the neural network; and estimate the number of multi-paths based on the extracted singular value.

11. The UE of claim 10, wherein, to estimate the number of multi-paths based on the extracted singular value, the controller is configured to:

perform encoding and decoding on a matrix generated based on the singular value;

obtain an output matrix based on the encoding and decoding; and determine a rank value of the output matrix to be the number of multi-paths.

12. The UE of claim 11, wherein to perform the encoding and decoding on the matrix generated based on the singular value, the controller operates based on a network model optimization.

13. The UE of claim 10, wherein the controller removes noise of the CSI based on the estimated number of multi-paths.

14. The UE of claim 13, wherein the controller predicts all data based on the CSI from which the noise has been removed.

15. The UE of claim 14, wherein all the data is quantized based on quantum levels.

16. The UE of claim 15, wherein the quantum level is determined according to a congestion level.

17. The UE of claim 15, wherein the controller transmits the quantized data to the base station using a physical uplink control channel (PUCCH).

18. The UE of claim 17, wherein the controller determines a cycle of an operation performed by the UE based on a mobility level of a network.

* * * * *